April 14, 1936.  J. S. PECKER  2,037,433
AIRCRAFT WITH ROTARY SUSTAINING WINGS
Filed June 30, 1932  5 Sheets-Sheet 2

INVENTOR.
Joseph S. Pecker
BY
ATTORNEYS

April 14, 1936. J. S. PECKER 2,037,433
AIRCRAFT WITH ROTARY SUSTAINING WINGS
Filed June 30, 1932 5 Sheets-Sheet 3

INVENTOR.
Joseph S. Pecker
BY
ATTORNEYS

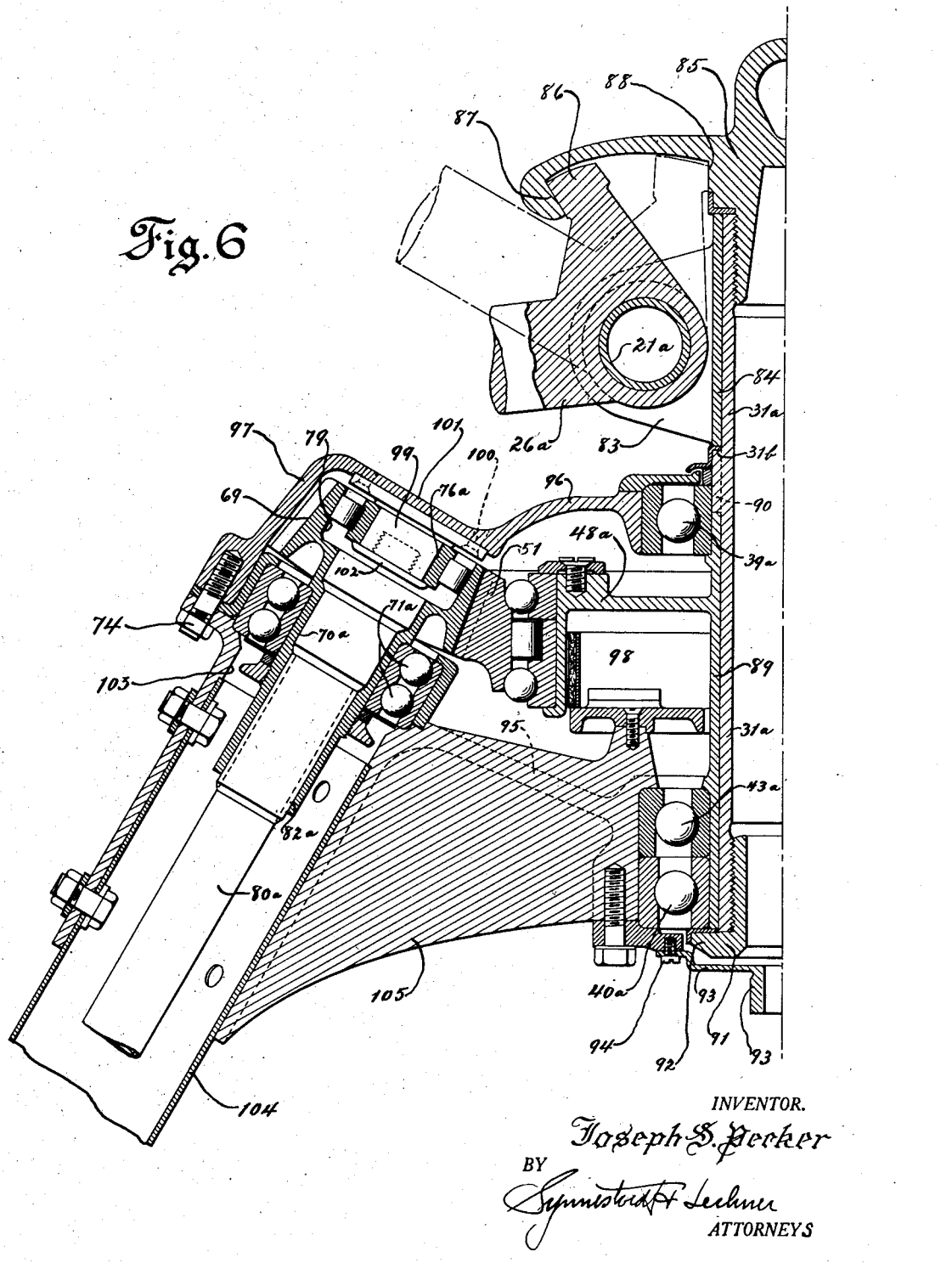

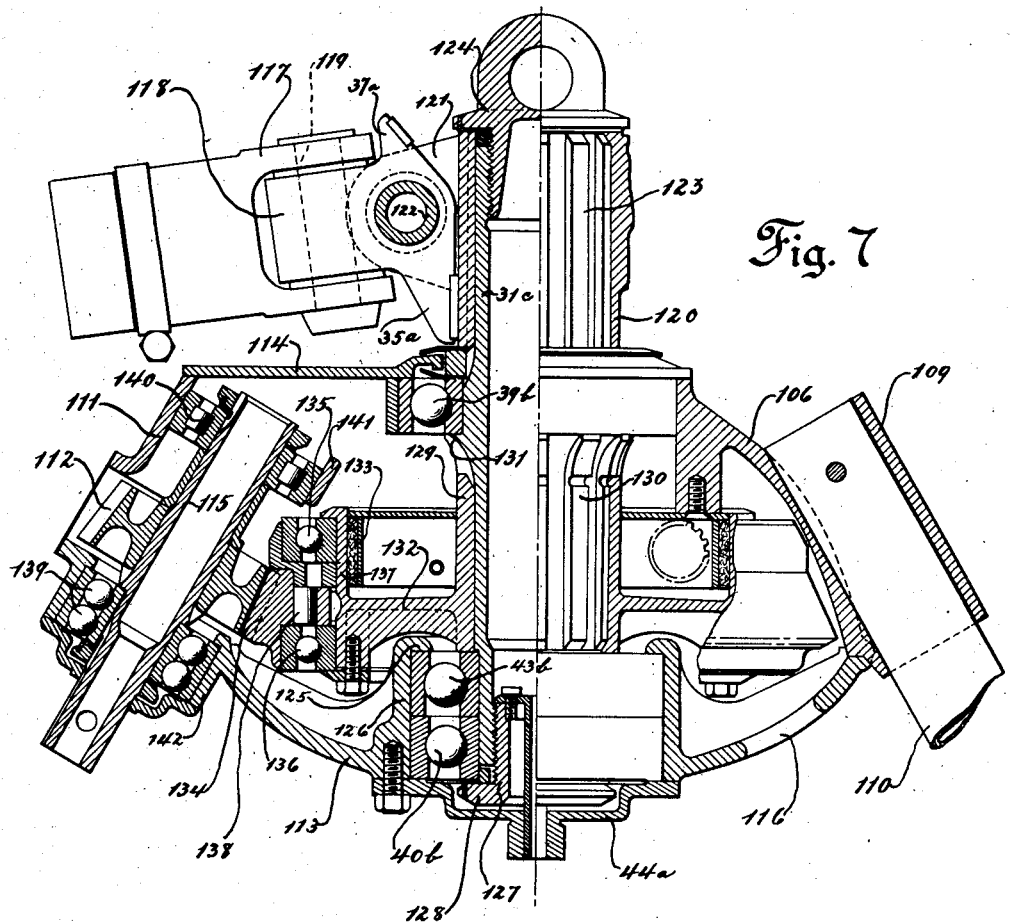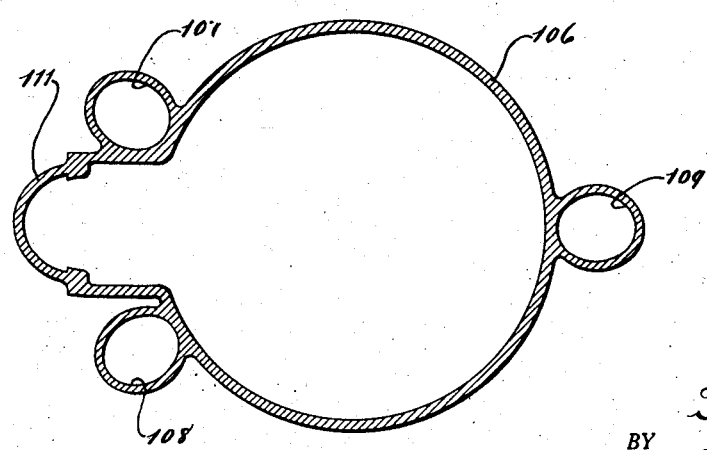

UNITED STATES PATENT OFFICE 2,037,433

AIRCRAFT WITH ROTARY SUSTAINING WINGS

Joseph S. Pecker, Philadelphia, Pa., assignor to Autogiro Company of America, Philadelphia, Pa., a corporation of Delaware Application June 30, 1932, Serial No. 620,076

34 Claims. (Cl. 244—19)

This invention relates to aircraft with rotary sustaining wings and is particularly concerned with novel features of a mounting and supporting structure for the rotating wings or blades.

Before considering some of the objects of this invention, attention is called to the fact that the type of aircraft to which the invention relates ordinarily includes a system of sustaining blades or wings mounted for normally free actuation under the influence of relative air-flow in flight and pivoted or articulated to a central hub or axis structure, whereby to provide for movement of the individual blades or wings transversely of as well as within their general path of rotative travel.

As one important object, the invention contemplates an improved rotor supporting and axis structure which has greater strength than prior arrangements employed and which, at the same time, is of less total weight and overall dimensions. In addition to relatively small overall dimensions, the structure is such as to present a small frontal area, with all the parts thereof well rounded and streamlined, whereby to reduce parasite drag, skin friction and the like to a minimum.

As a further object, the invention has in view the provision of a novel supporting structure which cooperates with a means for driving the rotor, especially useful in imparting an initial torque thereto prior to take-off, in adequately caring for the stresses of the starting or driving torque and distributing the loads as directly as possible to fixed supporting parts.

A still further object of this invention resides in the improvement of the general appearance of the craft as a whole, and particularly of the rotor supporting structure.

I also contemplate a supporting and axis arrangement for the rotor system wherein radial and thrust bearings transmit the stresses and load to the body of the craft through a relatively strong and rigid fixed supporting structure, the arrangement further being such as to minimize vibration and deflection of the parts.

In addition to the foregoing, the invention also has in view the provision of a supporting or mounting structure for a rotor, equipped with driving as well as braking means, in which both the driving and braking loads and stresses are transmitted to a rotor axis member between bearing means which are spaced along the rotor axis. In this way the operation, particularly the smoothness thereof, is materially improved.

To consider another object of this invention, it should be noted that the rotor driving or starter mechanism which I employ includes a ring gear mounted in association with a rotor axis member and cooperating with a pinion which is coupled by means of a shaft to a suitable source of power, preferably the forward propulsion engine, located in the body of the craft. According to this invention, the rotor axis member just referred to and thus the ring gear carried thereby, and the driving pinion are both journalled and mounted in a single rigid structure. The advantage of this is further improvement in the smoothness of operation since lost motion or weaving between the gears is reduced to a minimum. This is also of importance in reducing wear of the gears and other parts.

I also contemplate a substantially direct transmission of thrust and radial loads from the rotor through the thrust and radial bearings to fixed supporting elements which are connected with the body of the craft. This direct transmission of thrust is of very material importance in reducing weaving and vibration in the rotor in relation to the body of the machine.

As a still further object the invention provides means whereby different types of rotors may readily be employed with a given supporting and mounting structure, this latter structure also including the starter and braking mechanisms. An important feature of this arrangement also resides in the provision of substantially a single securing nut by means of which the blade or wing system may be removed and replaced as a unit, for purposes of inspection, repair, substitution and the like.

While obtaining some of the advantages last considered, the arrangement of this invention further makes it possible to dismount the rotor, either for the purpose of substituting a different rotor or for the purpose of making repairs or inspection, without disturbing the main radial and thrust bearings incorporated in the mounting structure.

In craft where the rotor system is mounted substantially above the body or fuselage as by means of pylon legs or struts, the present invention contemplates an arrangement whereby the rotor driving or starter shaft may be extended upwardly through one of such supporting struts. Additional reduction in the number of exposed parts is thus obtained and as a result undesirable drag is further reduced.

In addition to numerous other objects and advantages which will appear more clearly hereinafter, it should be noted at this point that the present invention provides for the complete encasing or enclosing of all operating parts of the rotor hub and mount, including the driving gears, braking parts, bearings and the like. Dust, dirt, and the like are thus efficiently excluded, and at the same time the danger of injury or damage to these parts by contact with others is reduced to a minimum.

How the foregoing objects and advantages together with others which will occur to those skilled in the art are obtained will be more apparent from the following description making reference to the acocmpanying drawings, in which—

Figure 4 is a horizontal sectional view taken substantially as indicated by the line 4—4 on Figure 2;

Figure 5 illustrates a detail of the driving connection associated with the rotor hub;

Figure 6 is a vertical sectional view through a portion of another rotor mounting structure illustrating certain modifications over the showing of Figures 2 to 5 inclusive;

Figure 7 is a view taken similarly to Figure 2 but illustrating a still further modified arrangement; and Figure 8 is a horizontal sectional view through one of the casing parts of the arrangement of Figure 7.

Figure 1:
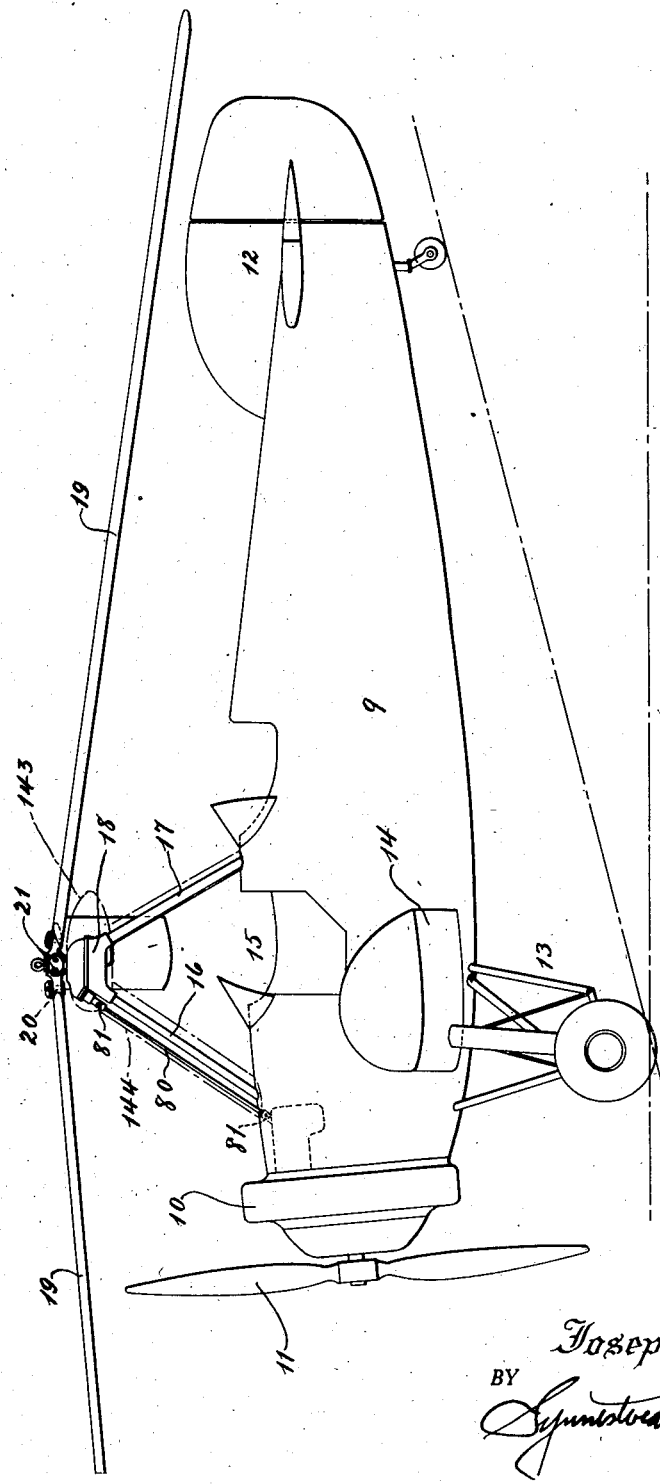
Figure 1 is a side view of an aircraft of the type to which this invention relates, the craft being equipped with a rotor mounting and supporting structure, as well as other features, all constructed in accordance with this invention.

As seen in Figure 1, the craft to which the features of this invention have been applied in the drawings may include a body or fuselage 9 having engine and propeller 10 and 11, and an empennage 12. Suitable landing gear 13 may also be provided and, if desired, the craft may be equipped with supplemental fixed lifting surfaces 14 extended at opposite sides thereof.

The rotor system, in accordance with the showing of Figure 1, is mounted above a cockpit 15 in the fuselage 9 as by means of the pylon struts 16 and 17, terminating in and supporting an apex structure generally indicated by the reference numeral 18. The blades or wings 19 of the rotor itself are pivoted or articulated on substantially vertically extended pivot pins 20 and substantially horizontally extended pins 21 to an axis structure (to be described more fully hereinafter) which extends downwardly into the apex 18.

Figure 2:
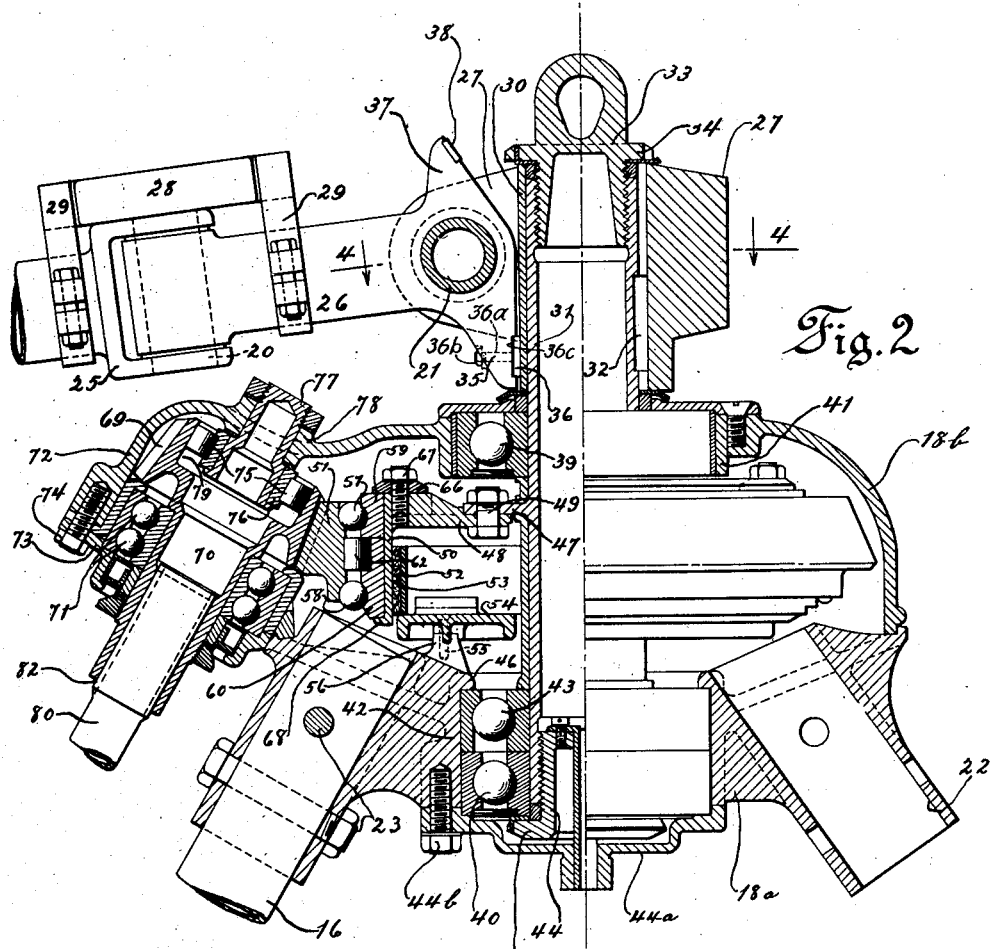
Figure 2 is a vertical sectional view taken through the rotor axis, hub and mounting parts.
Figure 3:
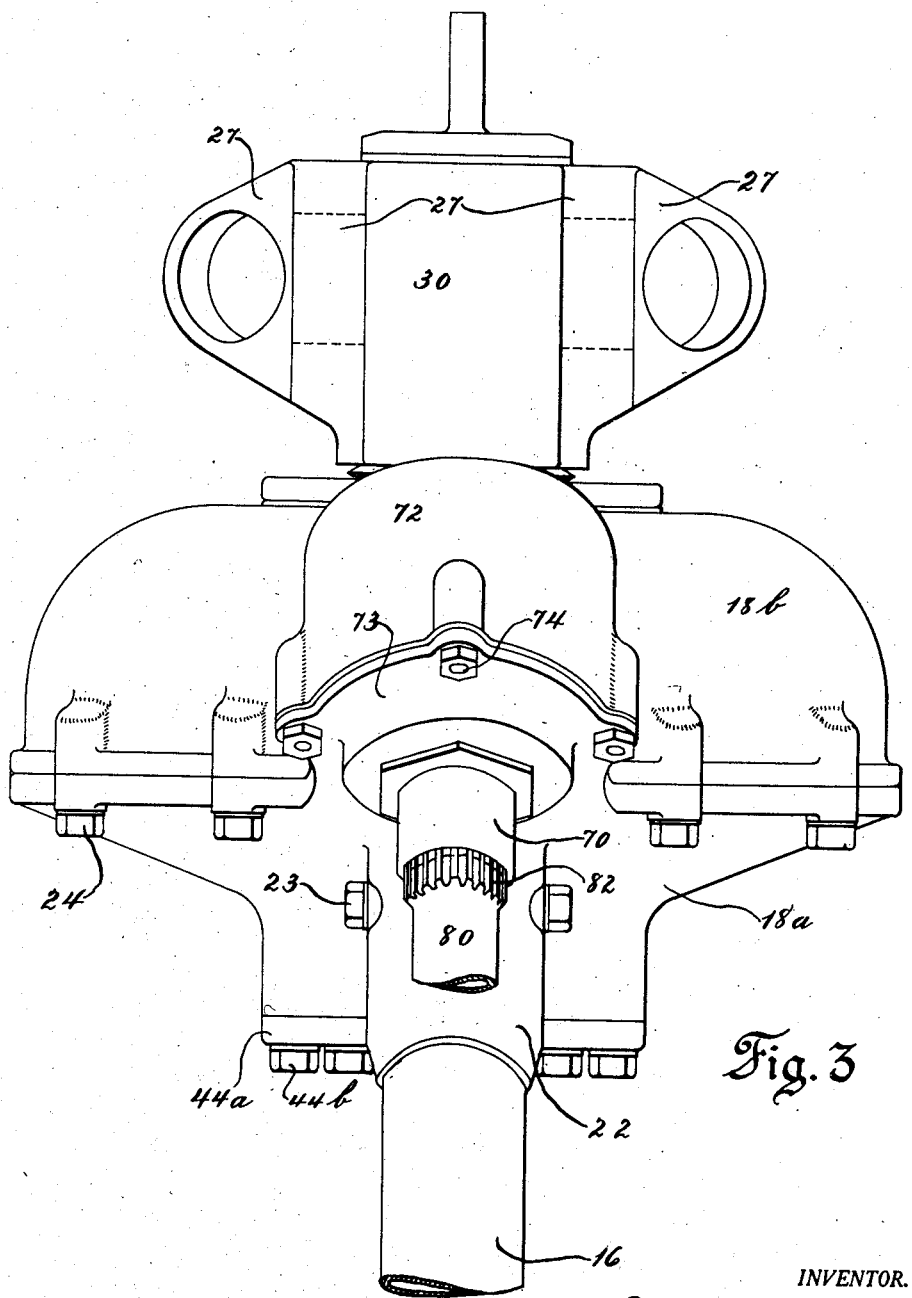
Figure 3 is a front elevational view of the structure appearing in Figure 2.

By reference more particularly to Figures 2 to 5 inclusive, it will be seen that, in accordance with this form of the invention, only two pylon legs or struts are employed to support the rotor and that these struts terminate in sockets 22 formed in a casting or base 18a of the apex structure 18. Securing means such as bolts 23 may be employed to fasten the pylon struts in their sockets. The apex structure 18 further includes an upper casting or enclosure 18b secured, as seen in Figure 3, by bolts 24 to the base part 18a. This general apex structure, therefore, is of simple and yet extremely rigid form, it being noted that the pylon struts are socketed directly therein whereby to provide rigid support from the body of the craft.

As clearly shown in the upper left hand portion of Figure 2, the inner or root end of each blade terminates in a forked fitting 25 which cooperates with the vertical pivot pin 20, above referred to, and embraces the outer end of an extension block or link 26. The block 26, in turn, fits between and is coupled to a pair of apertured lugs 27 as by means of the horizontal pin 21. In order to control certain blade movements generally within their rotative path of travel, each blade is preferably equipped with a movement control or damping device diagrammatically shown at 28 which is coupled, by means of brackets 29, to the blade itself and also to the extension block 26. The details of this structure, however, need not be considered herein, since they are described and claimed in the copending application of Juan de la Cierva, Serial No. 614,475, filed May 31st, 1932, and issued March 19, 1935 as Patent No. 1,994,465.

By reference more particularly to Figure 4, it will be seen that the lugs 27 for receiving the horizontal pins 21 of the several blades are formed on a hub part 30 which is centrally apertured to receive the rotor axis member 31. This hub, furthermore, is splined or keyed to the member 31 as indicated at 32 in Figures 2 and 4, in order to prevent relative rotation of the two parts and yet permit axial separation thereof. The thrust of sustension in flight is transmitted from the hub member 30 to the axis member 31 by means of the nut device 33 threaded into the part 31 and having an external flange 34 overlying the upper end of the part 30.

It will be noted that the showing, particularly of Figure 4, includes a hub member adapted to mount a three-bladed sustaining rotor. However, the arrangement of the hub and axis parts as above described, in addition to providing for removal of the rotor as a unit for purposes of inspection and repair, also makes it possible to employ a rotor having a different number of blades, since it is only necessary to substitute a different hub part 30 which may be similarly splined to the main axis member 31.

While other arrangements may be used for the purpose of preventing excessive drooping of the blades when they are at rest or not rotating at flight speeds, I prefer to employ, for each blade, a stop member 35 formed on the extension link 26 in a position to contact with a lower part of the hub member 30, as clearly shown in Figure 2. In order to permit adjustment of the position at which the blades will be supported, a block or the like 36 is mounted, as by means of the threaded shank 36a and nut 36b, on the stop 35. Shims 36c may be placed underneath blocks 36 for adjusting purposes. Similarly, in order to prevent excessive upward swinging movements of the blades, the link 26 for each blade may also be equipped with an additional stop 37, preferably provided with a fibre bumper 38, arranged to contact with an upper portion of the hub upon excessive upward swinging movement about the horizontal pivot pin 21.

The main rotor axis member 31 extends downwardly into the apex structure 18 and radial bearings 39 and 40 surround the axis part 31 at points adjacent the upper and lower sides of the apex. The outer races of the bearings 39 and 40 are received in cylindrical parts 41 and 42 formed, respectively, on the upper and lower apex members 18b and 18a. A main thrust bearing 43 is preferably disposed in the cylindrical part 42 just above the lower radial bearing 40, and in order to transmit the thrust of sustension from the axis member 31, I have employed a nut device 44 threaded into the lower end thereof and having an external flange 45 extended outwardly below the inner races of bearings 40 and 43. At the upper edge of the outer race of bearing 43, the apex member 18a is provided with an internal flange 46 through which the thrust is transmitted to the supporting legs or struts 16 and 17.

It will be noted in considering the arrangement of the bearings, particularly of the thrust bearings, that the lift or thrust, in flight, is transmitted almost immediately from the main axis member to the supporting struts 16 and 17, it being necessary to provide only a relatively small structure (base 18a) to interconnect the pylon struts and the outer race of the thrust bearing. In addition to material reduction in overall size and weight of the rotor mounting parts, this arrangement is also of advantage in greatly reducing weaving, vibrations and the like. Since the apex structure 18 is of relatively small size and rigid construction, the radial loads transmitted through bearings 39 and 40 are also well cared for and efficiently transmitted to the fixed structure and finally through the supporting struts 16 and 17 to the body of the craft.

As best seen in Figures 2 and 3, a cap member 44a may be employed to close the open lower side of the base 18a, this cap being secured in place by means of bolts 44b. With the arrangement shown, access to the removal nut device 44, for purposes of permitting upward withdrawal of the main axis member 31, may readily be had by simply removing the cover plate 44a. This also exposes certain of the bearing parts to inspection.

At a point intermediate the bearings 39 and 43, the hub member 31 is provided with an external flange 47 to which a generally annular member 48 is secured as by means of bolts 49. This member 48 carries (preferably formed integrally therewith) a depending and substantially cylindrical flange 50 which serves as a support for the ring gear 51.

Before considering the manner in which the gear 51 is mounted, attention is called to the fact that a brake band 52 of the expanding type is located internally of the cylinder or drum 50 so as to react, through brake lining material 53, against the inner surface thereof. These braking parts need not be considered in detail herein, although it might be noted that they are conveniently supported on an annular ring or base 54 secured, as by bolts 55 tapped into lugs 56 formed integrally with the base 18a of the apex.

The ring gear 51 is preferably formed on its inner surface to serve as a race for two series of bearing balls 57 and 58. An additional race 59, surrounding the cylindrical part 50, cooperates with the bearing balls 57 while a race 60 cooperates with balls 58 to complete the other bearing. Race 60 also serves as one part of an overrunning or free-wheeling clutch which is operatively interposed between the gear 51 and the cylindrical portion 50 of the member 48. As seen in Figures 2 and 5, this clutch is formed by means of cut-out portions or recesses 61 provided in the bearing race 60 to receive rollers 62. The rollers, of course, also cooperate with the inner surface of the ring gear 51, and each of them is urged into engagement therewith by a small plunger 63 supported by spring 64 reacting against plug member 65. From reference to Figure 5 it will be seen that the action of the clutch is such as to prevent relative rotation of the members 51 and 60 in one direction but to permit such rotation in the opposite direction.

In order to rigidly secure the bearing races 59 and 60 to the part 48 which rotates with the sustaining blades, the race 60 may be shrunk on the cylindrical part 50 and an annular ring 66 (see Figure 2) bolted, as by studs 67, in position to overlie the race 59.

Before considering the mounting and arrangement of the pinion for driving ring gear 51, it should be noted that the roller clutch arrangement just described is of especial advantage in permitting absolutely free overrunning of the rotor on the ball bearings 39, 57, 58, 43 and 40. At the same time, the bearings 57 and 58 also serve to take all stresses and irregular loads between ring gear 51 and drum 50, and thus relieve the roller members 62 of such loads, so that a highly efficient driving connection is provided through the overrunning clutch without subjecting any parts thereof to undesirable stresses. Considerable advantage, especially from the standpoint of reduction in weight and number of parts, is also afforded, since the ring gear itself is formed to serve not only as one element of the rotor clutch but also as races for the ball bearings, and further since the inner race 60 performs a double function in completing the bearing 58 and serving as the inner or driven element of the overrunning clutch.

Another and very important advantage of the foregoing overrunning clutch arrangement resides in the fact that, during normal rotor operation, the gearing and other driving parts are completely disconnected at a point closely adjacent the rotor axis itself. This, of course, results in the elimination of undesired drag or load.

The driving pinion 69 which cooperates with ring gear 51 is mounted on a shaft 70 journalled by means of bearings 71 in an extension or enlargement 72 of the upper apex member 18b. It will also be observed, see Figures 2 and 3, that the lower apex member 18a is provided with a substantially flat plate-like extension 73 which serves as a closure member for the lower side of the extension 72, bolts 74 being provided to rigidly secure these parts together.

In contradistinction to certain prior arrangements, wherein bearings for the rotor driving pinion were employed at a point only below the pinion itself, the structure of the present invention further makes provision for an upper bearing illustrated in Figure 2 as including roller members 75 mounted in a race 76 carried by the shaft 77. The shaft 77 is secured and supported in a boss 78 formed on the upper side of the extension casing 72, and the bearing is completed by the formation of a cylindrical cavity 79 formed in the pinion 69 itself. In this way, the pinion does not have a free overhang beyond any bearing but is supported and journalled at both ends with the result that strains on the bearings and the gearing are materially reduced.

It should further be observed in connection with the foregoing structure that since the pinion as well as the driven gear 51 and other associated parts are all rigidly journalled and supported in a single mounting structure (the apex 18), the proper relation between the gears is always maintained and vibrations incident to driving are substantially eliminated. Wear is also materially reduced by this arrangement.

The driving shaft 80 (see Figures 1, 2 and 3) is preferably extended upwardly from the forward propulsion engine 10 generally along the front of and closely adjacent the forward pylon strut 16. This shaft may be equipped with flexible or universal joints 81, as shown in Figure 1, located, respectively, adjacent the apex 18 and within the body of the craft, and this shaft is also preferably splined, as indicated at 82 in Figures 2 and 3, with the lower portion of the pinion shaft 70.

From the foregoing discussion of the embodiment of the invention illustrated in Figures 1 to 5 inclusive, it will be apparent that, in addition to the objects and advantages hereinbefore referred to, this invention also results in a material reduction in the overall height of the rotor mount, axis and hub. At the same time, ample clearance is afforded between the sustaining blades or wings themselves and all parts of the apex structure, including the forward extension or casing 72 for housing the driving pinion 69. From inspection of Figure 2 particularly, it will be seen that by disposing the driven ring gear 51 intermediate the spaced bearings 39 and 40, 43— the overall dimension or height of the apex (including all the elements associated therewith such as the driving gear, brake, etc.) is very materially reduced over that possible with prior constructions. Furthermore, by arranging the primary rotatable rotor axis part (31) internally of the main rotor bearings (39, 40 and 43), with the fixed supporting structure surrounding the rotating axle, the overall height and size of the rotor mount is still further reduced. This general arrangement is also at least in large part responsible for the improved clearances provided, especially between the rotor blades or wings and the forward extension or housing 72 for the driving pinion 69.

Turning now more particularly to the showing of Figure 6, reference is first made to the modified blade attachment and pivot arrangement which includes a member 26a apertured to pass the horizontal pivot pin 21a which, in turn, is journalled in lugs 83 formed on hub member 84. Rotor axis part 31a extends upwardly from the apex structure through the hub 84 and may be secured thereto as against rotation by means of a splined joint such as that described in connection with Figure 2, or by an upper nut device 85 threaded into axis member 31a and reacting, through the hub member 84 itself, against the shoulder 31b.

In accordance with this modified structure, the blade attaching member 26a may also be provided with an upwardly extended stop or abutment 86 which cooperates with complementary abutments 87 and 88 to limit the downward swinging movement of the blade about the pivot 21a (see full line showing in Figure 6) and also excessive upward movement of the blade (see dot and dash line showing in Figure 6). One important advantage of such a stop arrangement resides in the fact that the point at which the blades are attached or mounted on the axis structure may be lowered somewhat as compared to the arrangement of Figures 1 to 5 inclusive, for the reason that clearance for a blade stop below the horizontal pivot is unnecessary.

Also, as contrasted with the embodiment previously described, the structure of Figure 6 makes provision for removal of the main axis member 31a without disturbing any of the bearings or other parts mounted in the supporting apex. To accomplish this, I have employed an additional sleeve-like member 89 into which the axis part 31 is extended, a splined connection 90 being provided between these two parts to prevent relative rotation thereof, permitting, however, axial displacment, for example, for the purpose of removing the rotor as a whole including the main axis spindle 31a. Upon such removal, the spindle 31a may be inserted in a suitable fixed support preferably spaced above the floor level and the rotor can then be inspected, adjusted, lubricated or repaired.

The bearing arrangements illustrated in Figure 6 are similar to those described above and include radial bearings 39a and 40a and a main thrust bearing 43a, although it will be noted that these bearings are positioned between the sleeve 89 and the fixed portion of the supporting apex, instead of directly between the apex and the main rotatable axis part as in the first described arrangement. A nut device 91 is also threaded into the lower end of the member 31a and provided with an external flange 92 similar to that referred to above in order to transmit the thrust of sustention from the rotor spindle to the bearings 40a and 43a, and from the outer race of the latter of these two bearings to the fixed apex structure. A removable cap 93 may also be arranged at the under side of the apex and secured in place by a few small bolts such as shown at 94.

While the fixed supporting apex of the modification of Figure 6 embodies certain changes over the arrangement shown in Figure 2, the general configuration and construction thereof rather closely follows that already described. In this instance, the lower base element is indicated by the reference numeral 95, while the upper apex part is designated by the numeral 96. The two parts 95 and 96 are bolted together in a manner similar to that already described, and the upper part is also provided with an extension 97 configured to receive and house the driving pinion 69. While the driving pinion, ring gear 51 and the bearings and roller clutch associated with the latter, are entirely similar to those described in connection with the showing of Figures 2, 3 and 5, it might be noted at this point that the annular member 48a, as seen in Figure 6, is formed integrally with the sleeve 89 instead of being bolted to an additional flange provided on the axis member 31a as in Figure 2. The rotor brake 98 is also arranged in the same manner as that already referred to.

In accordance with Figure 6, however, the driving pinion 69 is provided with a different upper bearing arrangement. In this instance, the bearing race 76a is carried by a spindle 99 bolted or otherwise secured as at 100 to the upper wall 101 of the extension casing 97. A flanged bolt-like member 102 threaded into spindle 99 serves to retain the roller race 76a in proper position for cooperation with the cylindrical cavity 79 formed in the pinion 69. The bearing 71a for the pinion shaft 70a is disposed and supported similarly to the arrangement above considered in detail, although in the structure of Figure 6, the pinion shaft 70a is extended downwardly within the socket 103 provided in the apex base member 95 for the reception of the forward pylon leg or strut 104. In order to brace and strengthen this socket, and thus to provide a rigid structure between the pylon leg 104 and the bearings 40a and 43a, the base 95 is further provided with a substantially vertically extending web 105. In this mechanism, furthermore, the driving shaft 80a, splined as at 82a with the pinion shaft 70a, is extended upwardly from the body of the craft through the forward plyon leg 104.

From the foregoing it will be seen that the arrangement of Figure 6 also incorporates at least a major portion of the objects and advantages hereinbefore brought out. Specifically, this modification further improves the aerodynamic efficiency of the rotor mount as an entirety, in providing for extension of the starter or driving shaft 80a within one of the supporting struts. This is accomplished by means of relatively simple parts and structure without impairing the desired clearances for blade swinging movements and finally without necessitating increase in weight or size of parts.

The structure of Figure 6, particularly the bearing arrangement for the driving pinion, is also of advantage in reducing complication in manufacture of the apex members, it being noted that the upper pinion bearing is mounted without the use of parts projected through and above the casing extension 97.

Still further, in accordance with the showing of Figure 6, the rotor blades, together with their hub member 84, may be removed or lifted off the support merely by withdrawing the cap nut 85, this serving purposes similar to those referred to above. At the same time, if desired, the entire rotor, together with the main axis member 31a may be lifted from the fixed support without in any way disturbing the starter, brake, or bearing mechanisms. To accomplish this, the lower nut device 91 is removed, after which the splined connection between the sleeve 89 and the axle 31a permit relative axial separation of the parts.

In considering the arrangement of Figures 7 and 8, attention is first called to the fact that this structure illustrates a means by which the rotating spindle type of rotor axis, with fixed or stationary structure surrounding the axis, may be adapted to a supporting pylon arrangement having an increased number of struts or legs. This modification also illustrates a number of other advantageous features which will appear more fully as this description proceeds.

As here shown, an upper apex or casing part 106 is provided with three sockets for the reception of pylon-struts, these being indicated in Figure 8 at 107, 108 and 109. One of the struts is shown in Figure 7 at 110 as extending upwardly into socket 109.

Between the two sockets 107 and 108, which are preferably located toward the front of the apex structure, a casing extension 111 is provided in order to receive the driving pinion 112 of the rotor starter system. The casing or apex also includes a lower enclosure part 113 which may be bolted to the upper part in a manner similar to that described above and shown most clearly in Figure 3, as well as a removable cover plate 114 disposed over the upper end of the shaft 115 for the driving pinion 112, this plate being located in this manner in order to afford access to the bearings for the pinion as well as for the rotor or any other internally arranged parts. Further reduction in weight, as well as additional access to the interior of the apex casing, may be gained by means of apertures or cut out portions such as indicated at 116.

The blade mounting parts shown in Figure 7 differ somewhat from those described above and include a forked member 117 at the root of each blade embracing a block 118 to which the fork is connected by means of a pin 119. The block is attached to a hub member 120 by means of apertured lugs 121 and a horizontal pivot pin 122. Abutments 36a and 37a are provided on the block 118 in a manner similar to that described above in referring to Figure 2. Hub part 120 is also splined as at 123 to the main axis member 31c, a flanged retaining nut device 124 being provided at the upper end to secure the parts together in a manner similar to that already described. Radial bearings 39b and 40b are again arranged around the axis member 31c at spaced points in the apex structure and a thrust bearing 43b, similarly located, serves, during flight, to transmit forces and stresses from the spindle 31c to a shoulder 125 formed at the upper edge of a cylindrical wall 126, the latter preferably being cast integral with the base closure member 113. A removable nut device 127 having an outturned flange 128 is also here provided whereby to permit ready separation and removal of parts.

As in Figure 6, the arrangement of Figure 7 provides an additional sleeve 129 splined, as at 130, to the axle 31c. This also permits removal of the rotor blades or wings together with the hub member 120 and the central spindle 31c after the lower nut device 127 has been displaced. This removal will not disturb the positioning of the lower bearings, although since the upper radial bearing 39b is positioned by a shoulder 131 formed on the spindle 31c, this upper bearing will be carried with the spindle upon removal thereof.

Sleeve 129 is provided with a laterally extending flange or annular part 132 which cooperates with the rotor brake 133 and also serves to receive the driving force transmitted from the pinion 112 to the ring gear 134. Spaced bearings 135 and 136 are also interposed between the ring gear 134 and the cylindrical wall 137 of the flange 132. A roller clutch 138 similar to that described above is interposed between the spaced bearings 135 and 136.

While the bearing and overrunning clutch arrangement just described involves the use of some parts in addition to those necessary in the constructions already considered, at the same time it should be observed that this arrangement provides for the employment of roller bearings and the like of standard manufacturing specifications. This bearing and clutch arrangement, however, also affords the advantages brought out above with respect to relieving the roller clutch parts of all stresses and the like incident to driving.

Pinion shaft 115, as in the previouly considered structures, is also here equipped with bearings 139 and 140 disposed above as well as below the pinion itself whereby to avoid an overhang which might otherwise result, in a less rigid support, in weaving, whip and consequent wear of the parts, especially the gears. The upper bearing 140 may conveniently be mounted in a cylindrical cavity formed by wall 141, a similar cylindrical wall 142 being provided for the lower bearings.

From the foregoing description it will be seen that the features embodied in the structure of Figures 7 and 8 also attain at least a major portion of the objects and advantages above set forth. In Figure 7, however, the arrangement is such that certain of the bearing, brake and starter parts may be exposed for inspection or repair by removal of the lower apex closure member 113. This may be accomplished, first by removing the lower closure cap 44a and then by displacing the nut device 127, thus permitting relative separation of the two casing parts 106 and 113, upon removing the bolts or the like by means of which these two casing parts are normally secured to each other.

With respect to the modification of Figures 7 and 8 (see Figure 8 particularly) it will further be observed that the spaced arrangement of the sockets 107—108 for receiving the pylon struts, neatly cooperates with the casing extension for receiving the driving pinion and shaft, not only to simplify the structure and permit effective streamlining thereof as a whole, but also to rigidly brace that portion of the casing in which the bearings for the driving pinion are mounted.

An advantage peculiar to the modification shown in Figures 7 and 8 arises from the fact that the casing or housing which receives practically all of the mounting and operating parts for the rotor is dropped down to lie substantially within the tip of the imaginary pyramid formed by the pylon legs (extended), this being accomplished by attaching the pylon legs to the upper half of the separable casing which forms the pylon apex as well as the housing for the operating parts of the rotor.

With respect to all of the foregoing structures, attention is called to the fact that all forms of the invention lend themselves readily to streamlining of the rotor mounting structure as indicated, for example, in Figure 1 at 143 in dot and dash lines. In this way, a very neat and highly efficient aerodynamic structure may be afforded, the said structure being of minimum overall dimensions and yet having adequate strength to withstand all the normal stresses to which the parts are subjected. It might also be observed that while the rotor driving shaft 80 may be extended upwardly through a pylon post as illustrated in Figure 6, if desired, the aerodynamic efficiency of those arrangements in which the shaft extends along a pylon post may be improved by employing a streamlined casing 144 as shown in Figure 1.

The extreme simplicity and yet great strength of the rotor mount, bearing arrangement and the like of this invention are of very great advantage and importance, and with respect to this matter it should be observed that while great simplicity is afforded, at the same time the structure is such as to permit ready access to any desired part of the rotor mount including the starter, the brake, the bearings, and the blade mounting parts themselves.

Another advantage of very great importance results from the use of an internal and rotating axis or spindle part which is journalled within a surrounding, fixed supporting structure. With such a structure, especially where the main supporting elements, such as the pylon posts 16 and 17, are directly received in sockets formed as an integral part of the fixed housing for the bearings, the loads, thrusts, and stresses incident to flight operation as well as landing and take-off, are all directly, if not immediately, transferred from the rotating axle to the pylon struts and therethrough to the body of the craft. Extreme rigidity, while maintaining minimum weight of parts is thus afforded, and this in turn results in improved operation, particularly with respect to smoothness, since weaving, vibration and the like are practically eliminated.

All forms of the mechanism hereinbefore described have as their outstanding characteristic that, regardless of the number of legs making up the rotor mounting pylon, the upper end or apex of the pylon is itself formed as the support, casing or recess for the rotor axis, bearings, brake and driving mechanism, and associated parts; cutting almost in half the overall height and bulk as compared with pylon apex and rotor head constructions heretofore in use.

I claim:—

1. For an aircraft sustaining rotor, a mounting mechanism for supporting the rotor above the body of the craft including a normally fixed support, a rotor axis member extended in a generally upright direction through said support, a bearing interposed between said support and said axis member, and a removable device for transmitting the thrust of sustention from the rotor to the fixed support through said bearing, the fixed support, axis member and said device being relatively arranged and constructed to provide for removal of the rotor, upon removal of the said device, substantially without disturbing the relation of the fixed support, bearing and axis member.

2. For an aircraft sustaining rotor including blade or wing means, a rotor axis member, a fixed supporting structure surrounding said axis member, spaced apart bearings between the axis member and the supporting structure, rotor driving means horizontally offset from and connected with said axis member between said spaced apart bearings, and a device for disconnecting the driving means at a point relatively close to the rotor axis member.

3. For an aircraft sustaining rotor including blade or wing means, a rotor axis member, a fixed supporting structure surrounding said axis member, spaced apart bearings between the axis member and the supporting structure, rotor driving means connected with said axis member between said spaced apart bearings, and an overrunning clutch device associated with the driving means relatively close to the rotor axis member.

4. For an aircraft sustaining rotor, a mounting structure including upper and lower relatively separable housing parts, a rotor axis member journalled in said structure, means for driving the rotor including a gear housed in said structure and connected with the axis member, and a cooperating driving gear journalled in upper and lower relatively separable housing parts, whereby weaving or deflection of the gearing during driving operation is minimized while access may be had to the driving connection by relatively separating the said housing parts.

5. For an aircraft sustaining rotor, relatively rotatable axis members one of which is connected with the rotor and the other of which cooperates with the first and is mounted above the body of the craft, spaced apart bearing means interposed between said axis members, and rotor driving mechanism horizontally offset from and connected with the axis member rotatable with the rotor at a point between said spaced apart bearing means.

6. For an aircraft sustaining rotor, relatively rotatable axis members one of which is connected with the rotor and the other of which is connected with the body of the craft, spaced apart bearing means interposed between said axis members, and rotor driving mechanism including a gear and an overrunning clutch connecting the gear with the axis member rotatable with the rotor at a point between said spaced apart bearing means.

7. For an aircraft sustaining rotor, a driving connection including, in combination with a part rotatable with the rotor, a driven gear, bearing means including rolling elements interposed between the gear and said part, and overrunning clutch means also interposed between the gear and said part.

8. For an aircraft sustaining rotor mechanism of the character described, a supporting structure, a rotor axis member journalled in said structure, a driven gear, rolling bearing elements positioned around said axis member and on which said gear is rotatably mounted, and means for connecting said driven gear to said axis member.

9. For a sustaining rotor of the character described, starter mechanism of the character including a driving shaft, a driven rotor axis, a gearing between the two including an external gear recessed internally to provide a bearing race for a gear supporting bearing.

10. For an aircraft sustaining rotor, a driving connection including, in combination with a part rotatable with the rotor, a driven gear, an overrunning clutch connecting the gear with said part, and bearing means for said gear operative to mount and position the gear substantially independently of the overrunning clutch.

11. For an aircraft sustaining rotor, a driving connection including a ring gear, bearing means for the gear, an overrunning clutch for connecting the gear with the rotor, said gear having portions thereof formed to cooperate immediately with the overrunning clutch and the bearing means.

12. For an aircraft sustaining rotor, a driving connection including a ring gear having surfaces formed to cooperate with bearing means therefor and with overrunning clutch parts, and rolling elements for the bearing means and the clutch cooperating with said surfaces.

13. For an aircraft sustaining rotor, a rotor axis member, a mounting structure surrounding at least a portion of the axis member, said mounting structure including upper and lower relatively separable housing parts, a bearing interposed between the axis member and an upper housing part, a bearing interposed between the axis member and a lower and relatively separable housing part, means for bracing said structure to the body of the craft, said means being connected with the mounting structure in such manner as to permit downward displacement of a lower housing part without disconnecting the said means so as to permit access to a lower bearing.

14. For an aircraft sustaining rotor having blade or wing means, an axis member for the blade or wing means rotatable therewith, a supporting structure surrounding a portion of the axis structure, bearing means interposed between the supporting structure and the axis member, a generally circular part secured to the axis member said part being rotatable with the axis member and located in a plane closely adjacent to the plane of said bearing means, a rotor driving connection connected with said circular part, and a rotor brake also connected with said circular part.

15. For an aircraft sustaining rotor having blade or wing means, an axis member for the blade or wing means rotatable therewith, a supporting structure surrounding a portion of the axis member, bearing means interposed between the supporting structure and the axis member, a flange-like part secured to the axis member said part being rotatable with the axis member and located in a plane closely adjacent to the plane of said bearing means and having a drum-like extension, a rotor driving connection connected with said extension exteriorly thereof, and a rotor brake operatively associated with said extension interiorly thereof.

16. For an aircraft sustaining rotor having blade or wing means, an axis member for the blade or wing means, a supporting structure surrounding a portion of the axis structure, bearing means interposed between the supporting structure and the axis member, a flange-like part secured to the axis member in a plane closely adjacent to the plane of said bearing means and having a drum-like extension, and a rotor driving mechanism including a ring gear surrounding said extension, and an overrunning clutch interposed between the ring gear and said extension.

17. For aircraft sustaining rotor, a rotor axis member, a mounting structure for the rotor surrounding at least a portion of the axis member, said mounting structure including upper and lower relatively separable parts, attachment means for post or bracing elements associated with a lower part, and a rotor brake connected with the axis member and reacting against the mounting part with which said attachment means are associated.

18. For an aircraft sustaining rotor, a rotor axis member rotatable therewith, a supporting structure, bearing means interposed between the supporting structure and the axis member, a plurality of pylon legs connecting said structure with the body of the craft including a hollow stress carrying leg, and a mechanism for driving the rotor including a driving connection extended upwardly from the body of the craft to the rotor through said hollow leg.

19. For an aircraft sustaining rotor, a rotor axis member, a fixed mounting structure surrounding at least a portion of the axis member, bearing means interposed between the axis member and the mounting structure, a post or bracing element connecting the mounting structure with the body of the craft, and a mechanism for driving the rotor including a driving connection extended upwardly from the body of the craft to the rotor through said hollow post or bracing element at an angle to the rotor axis.

20. An axis and mounting structure for a bladed aircraft sustaining rotor including an upright axis member on which the blades are mounted, a cylindrical part adapted to receive said axis member in telescoped relation and normally movable therewith, detachable means cooperating with the axis member and said cylindrical part providing for relative axial displacement and separation thereof, a mounting structure surrounding telescoped portions of said cylindrical part and said axis member, and bearing means interposed between the cylindrical part and the mounting structure, there being telescoped portions of said part and said axis member lying above and below the plane of the bearing means.

21. For an aircraft sustaining rotor having blade or wing means, an axis member on which the blade or wing means are mounted, a cylindrical part telescopically but separably associated with said axis member over an extended length thereof and normally rotatable therewith, detachable means for securing the axis member and said cylindrical part in normal operative position, and a mechanism for affecting rotation of the rotor surrounding telescoped portions of said axis member and the cylindrical part and operatively connected to said part, whereby the rotor, including said axis member, may be displaced, as a unit, with respect to said cylindrical part and the mechanism connected therewith.

22. For an aircraft sustaining rotor having blade or wing means, an axis member on which the blade or wing means are mounted, a cylindrical part telescopically and separably associated with said axis member and normally rotatable therewith, detachable means for securing the axis member and said cylindrical part in normal operative position, a mounting structure surrounding telescoped portions of said cylindrical part and said axis member, spaced apart bearing means interposed between the cylindrical part and said mounting structure, and a mechanism for effecting rotation of the rotor surrounding telescoped portions of the axis member and the cylindrical part and operatively connected to said part between spaced bearings, whereby the rotor, including said axis member, may be displaced, as a unit, with respect to said cylindrical part, the mechansm connected therewith, and the spaced bearings.

23. For an aircraft sustaining rotor having blade or wing means, an axis member on which the blade or wing means are mounted, a cylindrical part telescopically but separably associated with said axis member over an extended length thereof and normally rotatable therewith, detachable means for securing the axis member and said cylindrical part in normal operative position, a supporting structure, and a rotor brake surrounding telescoped portions of the axis member and the cylindrical part and arranged to react between said structure and said part.

24. For an aircraft sustaining rotor having blade or wing means, an axis member on which the blade or wing means are mounted, a cylindrical part telescopically but separably associated with said axis member over an extended length thereof and normally rotatable therewith, detachable means for securing the axis member and said cylindrical part in normal operative position, a supporting structure, and rotor driving means mounted on said structure, surrounding telescoped portions of the axis member and the cylindrical part and connected with said cylindrical part for transmission of torque therethrough to the rotor.

25. For an aircraft sustaining rotor, a rotor axis member, and a mounting structure in which the rotor axis member is journalled, said mounting structure having a casing or housing extension at one side thereof adapted to accommodate a rotor driving connection, and further having attachment means for supporting post or bracing elements disposed closely adjacent to and at opposite sides of said casing extension.

26. For an air rotor having an axis member and a wing or blade positioned for aerodynamic rotation about said axis member; a flexible or pivotal mounting for said wing on said axis member and providing for some up and down movement of the wing, a cantilever stop to support the blade as against excessive downward droop on its pivotal support, and means for adjusting the position at which the wing will be supported by said stop.

27. In an aircraft sustaining rotor system adapted for use on an aircraft having a forward propulsion engine and propeller mounted in the body thereof, an axis member rotatable with the rotor, a supporting structure, bearing means interposed between the supporting structure and the axis member, a plurality of pylon legs connecting said structure with the body of the craft including a hollow stress carrying leg extended to a point adjacent said engine, and a mechanism for driving the rotor from said engine including a driving connection extended upwardly from the body of the craft to the rotor through said hollow leg.

28. For an aircraft sustaining rotor, means for supporting the rotor including an axis member, a mounting structure surrounding the axis member, spaced bearing means interposed between the axis member and the mounting structure, said mounting structure being split between the spaced bearing means to provide upper and lower portions separable to provide access to the bearing means, and bracing elements connecting the mounting structure with the body structure of the craft, said elements being attached to a lower one of said separable portions of the mounting structure substantially in a horizontal plane containing a lower one of said bearing means whereby the upper portion may be removed without disturbing said elements.

29. For an aircraft sustaining rotor, a mounting mechanism for supporting the rotor above the body of the craft including a normally fixed support positioned above the body structure proper, a rotor axis member extended in a generally upright direction through said support, a bearing interposed between said support and said axis member, and a removable device for transmitting the thrust of sustention from the rotor to the fixed support through said bearing, the removable device being disposed adjacent the bottom of the axis member, the fixed support, axis member and said device being relatively arranged and constructed to provide for removal of the rotor upon removal of the said device, without disassembling the bearing, axis member and fixed support.

30. For an aircraft sustaining rotor, a generally upright axis member, a hollow housing surrounding the axis member and constituting a fixed support for the rotor, and vertically spaced bearings interposed between the axis member and the housing, said housing being horizontally split in a plane between said vertically spaced apart bearings and upper and lower portions of the housing being separable for access to a bearing.

31. For an aircraft sustaining rotor, a pair of telescopically arranged axis members normally rotatable with the rotor, a hollow housing surrounding the axis members and constituting a fixed support for the rotor, bearing means interposed between said axis members and the housing, and a detachable device positioned adjacent the lower ends of said members for access from below said housing and normally serving to transmit the thrust of sustention of the rotor to the housing through the bearing means, the inner of said axis members being displaceable with reference to the outer one upon detachment of said device to provide for removal thereof without disturbing the relation of the outer axis member, the bearing means and the housing.

32. For an aircraft sustaining rotor, a pair of telescopically arranged axis members normally rotatable with the rotor, a hollow housing surrounding the axis members and constituting a fixed support for the rotor, bearing means interposed between said axis members and the housing, a detachable device positioned adjacent the lower ends of said members for access from below said housing and normally serving to transmit the thrust of sustention of the rotor to the housing through the bearing means, and means for effecting rotation of the rotor mounted in said housing and operatively connected with the outer of said axis members, the inner of said axis members being displaceable with reference to the outer one upon detachment of said device to provide for removal thereof without disturbing the relation of the outer axis member, the bearing means, the housing, and said means for effecting rotation of the rotor.

33. In an aircraft sustaining rotor, a generally upright axis structure, a plurality of rotative blades or wings, pivot means for joining each wing with the upright axis structure including a pivot providing for movement of the wing in a direction generally transverse its rotative path of travel and a pivot providing for movement of the wing in a direction generally within its rotative path of travel and the latter pivot being located outboard of the first, and means for preventing excessive downward movements of the blades or wings when the rotor is at rest or not rotating at flight speeds including a stop rigid with that part of the blade which is moveable in a direction transverse its rotative path of travel on the first pivot, said stop projecting upwardly from the blade whereby movement of the blade on said first pivot causes said stop to move toward and away from the axis structure, and a cooperating stop mounted on the axis structure and extended laterally therefrom radially beyond the stop first mentioned to cooperate therewith in arresting downward movement of the blade on the first pivot when the rotor is at rest or not rotating at flight speeds.

34. In an aircraft sustaining rotor, a generally upright axis structure, a plurality of blades pivoted to the axis structure, a stop carried by a blade and arranged to coact with a complementary stop in limiting pivotal blade movement, and a device at the top of the axis structure having said complementary stop formed thereon and further having means formed thereon and configured to cooperate with a lifting means for the craft.

JOSEPH S. PECKER.

CERTIFICATE OF CORRECTION.

Patent No. 2,037,433.                                              April 14, 1936.

JOSEPH S. PECKER.

It is hereby certified that error appears in the printed specification of the above numbered patent requiring correction as follows: Page 4, second column, line 2, for "displacment" read displacement; page 5, second column, line 50, for "previouly" read previously; page 7, first column, line 11, claim 9, strike out the words "of the character"; page 8, first column, line 13, claim 22, and second column, line 72-73, claim 32, for "effecting" read affecting; and that the said Letters Patent should be read with these corrections therein that the same may conform to the record of the case in the Patent Office.

Signed and sealed this 19th day of May, A. D. 1936.

Leslie Frazer (Seal)

Acting Commissioner of Patents.